(12) United States Patent
Sandstrom et al.

(10) Patent No.: US 7,231,951 B2
(45) Date of Patent: Jun. 19, 2007

(54) TIRE WITH CHAFER

(75) Inventors: Paul Harry Sandstrom, Cuyahoga Falls, OH (US); Thomas Joseph Segatta, Copley, OH (US); James Seven Guzi, Hudson, OH (US); Robert Anthony Neubauer, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 21 days.

(21) Appl. No.: 11/020,883

(22) Filed: Dec. 22, 2004

(65) Prior Publication Data

US 2006/0130954 A1 Jun. 22, 2006

(51) Int. Cl.
*B60C 1/00* (2006.01)
*B60C 15/00* (2006.01)
*B60C 15/06* (2006.01)

(52) U.S. Cl. .................. 152/543; 152/539; 152/547

(58) Field of Classification Search ............ None
See application file for complete search history.

(56) References Cited

U.S. PATENT DOCUMENTS

| | | | |
|---|---|---|---|
| 4,898,223 A | 2/1990 | Botzman et al. | 152/547 |
| 5,106,896 A | 4/1992 | Endo et al. | 524/318 |
| 5,252,650 A | 10/1993 | Wideman et al. | 524/318 |
| 5,306,772 A | 4/1994 | Mimura et al. | 525/92 |
| 5,474,604 A | 12/1995 | Demmering et al. | 106/38.24 |
| 5,885,389 A | 3/1999 | Sandstrom et al. | 152/543 |
| 6,057,392 A | 5/2000 | Wideman et al. | 524/318 |
| 6,116,313 A | 9/2000 | Costa Pereira et al. | 152/547 |
| 6,239,203 B1 | 5/2001 | Sandstrom et al. | 524/385 |
| 6,422,280 B1 | 7/2002 | Thomas | 152/540 |
| 6,648,041 B2 | 11/2003 | Ueyoko | 152/539 |
| 6,662,840 B2 * | 12/2003 | Thielen et al. | 152/547 |
| 6,719,029 B2 | 4/2004 | Close | 152/454 |
| 6,824,485 B2 | 11/2004 | Edwards et al. | 474/260 |
| 6,884,832 B2 | 4/2005 | Wentworth et al. | 524/306 |
| 7,021,633 B2 | 4/2006 | Gorman | 277/549 |

FOREIGN PATENT DOCUMENTS

| EP | 0906838 | 4/1999 |
|---|---|---|
| EP | 1125976 | 8/2001 |

OTHER PUBLICATIONS

European Search Report, 2006.

* cited by examiner

*Primary Examiner*—Justin R. Fischer
(74) *Attorney, Agent, or Firm*—John D. DeLong

(57) ABSTRACT

The present invention relates to a pneumatic tire having a pair of spaced apart bead components, a connecting carcass between said bead components, and a rubber chafer positioned around at least a portion of each of said bead components and intended for contacting a rigid rim of a wheel, wherein said chafer comprises a self lubricating rubber composition, the self lubricating rubber composition comprising at least one rubber and from 1 to 50 phr of at least one additive selected from alcohols of formula I, esters of formula II, or amides of formula III $$R_1\text{—OH} \quad (I)$$

$$R_1-\overset{\overset{\displaystyle O}{\|}}{C}-O-R_2 \quad (II)$$

$$R_1-\overset{\overset{\displaystyle O}{\|}}{C}-\overset{\overset{\displaystyle H}{|}}{N}-H \quad (III)$$

wherein $R_1$ and $R_2$ are independently selected from $C_{12}$-$C_{36}$ alkyl, $C_{12}$-$C_{36}$ alkenyl, or $C_{12}$-$C_{36}$ alkadienyl.

7 Claims, 1 Drawing Sheet

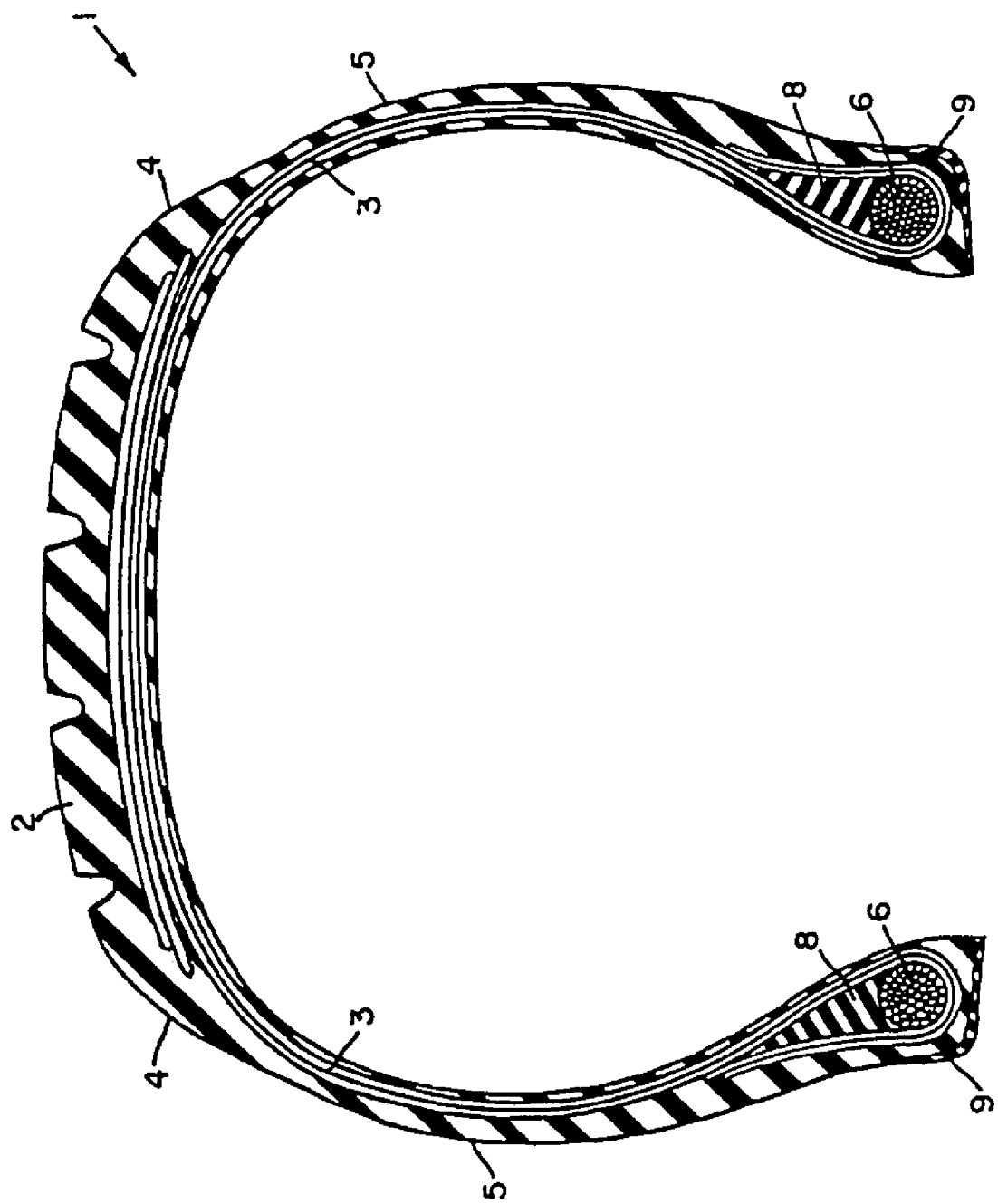

TIRE WITH CHAFER

BACKGROUND OF THE INVENTION

Pneumatic rubber tires conventionally have two spaced apart, relatively inextensible beads, usually composed of twisted, or cabled, metallic wires, which are surrounded by rubber components. A significant component which is conventionally positioned around a portion of the bead is the chafer. The chafer is a rubber composition conventionally designed to contact a rigid wheel rim and, therefore, interface between the tire and rim.

The chafer rubber composition is conventionally composed of a rubber composition which is carbon black reinforced. The chafer rubber composition may optionally contain a textile fabric reinforcement for dimensional stability, where the textile fabric portion of the chafer is conventionally adjacent to the bead portion of the tire, leaving the rubber portion of the chafer to contact the rigid wheel rim when the tire is mounted on such rim and inflated. In heavily loaded tires such as used in off-the-road applications such as mining, the chafer may be exposed to particularly harsh usage. There is a need therefore for an improved tire chafer.

SUMMARY OF THE INVENTION

The present invention relates to a pneumatic tire having a pair of spaced apart bead components, a connecting carcass between said bead components, and a rubber chafer positioned around at least a portion of each of said bead components and intended for contacting a rigid rim of a wheel, wherein said chafer comprises a self lubricating rubber composition, the self lubricating rubber composition comprising at least one rubber and from 1 to 50 phr of at least one additive selected from alcohols of formula I, esters of formula II, or amides of formula III

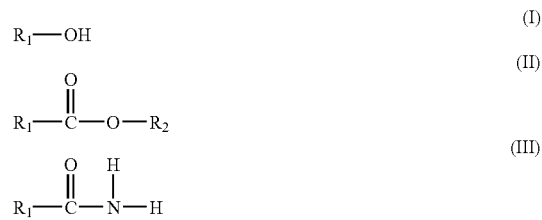

wherein $R_1$ and $R_2$ are independently selected from $C_{12}$-$C_{36}$ alkyl, $C_{12}$-$C_{36}$ alkenyl, or $C_{12}$-$C_{36}$ alkadienyl.

BRIEF DESCRIPTION OF THE DRAWING

The sole FIGURE illustrates one embodiment of a tire according to the present invention.

DETAILED DESCRIPTION OF THE INVENTION

There is disclosed a pneumatic tire having a pair of spaced apart bead components, a connecting carcass between said bead components, and a rubber chafer positioned around at least a portion of each of said bead components and intended for contacting a rigid rim of a wheel, wherein said chafer comprises a self lubricating rubber composition, the self lubricating rubber composition comprising at least one rubber and from 1 to 50 phr of at least one additive selected from alcohols of formula I, esters of formula II, or amides of formula III

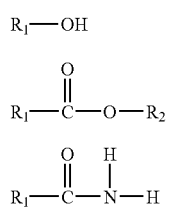

wherein $R_1$ and $R_2$ are independently selected from $C_{12}$-$C_{36}$ alkyl, $C_{12}$-$C_{36}$ alkenyl, or $C_{12}$-$C_{36}$ alkadienyl.

In one embodiment, the rubber composition may include at least one alcohol of formula I $$R_1\text{—OH} \qquad (I)$$

where $R_1$ is $C_{12}$-$C_{36}$ alkyl, $C_{12}$-$C_{36}$ alkenyl, or $C_{12}$-$C_{36}$ alkadienyl. In one embodiment, the alcohol may include 1-dodecanol(lauryl alcohol), 1-tetradecanol(myristyl alcohol), 1-hexadecanol (cetyl alcohol), 1-octadecanol(stearyl alcohol), 1-eicosanol(arachidyl alcohol), 1-docosanol(behenyl alcohol), 1-tetracosanol, 1-hexacosanol, 1-octaconsanol, 1-triacontanol (melissyl alcohol), 1-dotriacontanol, 1-tetratriacontanol and mixtures thereof. In one embodiment, the alcohol comprises 1-octadecanol.

One suitable octadecanol is commercially available from Procter & Gamble Chemicals under the designation CO-1895 Stearyl Alcohol. This product has a melting point of 58° C. and a G.C. Chain length distribution (percent by weight) of $C_{14}$, 0.1 percent; $C_{16}$, 1.3 percent; $C_{18}$, 95.5 percent; and $C_{20}$, 0.9 percent.

In one embodiment, the rubber composition may include at least one ester of formula II

where $R_1$ and $R_2$ are independently selected from $C_{12}$-$C_{36}$ alkyls. The esters may be produced by esterification of $C_{12}$-$C_{36}$ fatty acids with $C_{12}$-$C_{36}$ alcohols under suitable conditions as is known in the art. In one embodiment, the ester may be formed by reaction of the $C_{12}$-$C_{36}$ fatty acid with an aliphatic alcohol having from about 12 to about 36 carbon atoms under esterification conditions. In another embodiment, ester may be formed by reaction of a $C_{12}$-$C_{36}$ fatty acid with a dihydric or polyhydric alcohol, for example, glycerin, ethylene glycol, propylene glycol, pentaerythritol, and polyethylene glycol, and the like. In one embodiment, the ester may be a fatty acid ester of an aliphatic alcohol including dodecyl alcohol, tridecyl alcohol, tetradecyl alcohol, pentadecyl alcohol, hexadecyl alcohol, heptadecyl alcohol, octadecyl alcohol, nonadecyl alcohol, eicosyl alcohol, heneicosyl alcohol, docosyl alcohol or mixtures thereof. In one embodiment, the ester may be any of the dodecyl, tridecyl, tetradecyl, pentadecyl, hexadecyl, heptadecyl, octadecyl, nonadecyl, eicosyl, heneicosyl, or docosyl esters of any of stearic, oleic, palmitic, 9,12-linoleic, 9,11-linoleic(conjugated linoleic), pinolenic, eicosenoic, palmitoleic, magaric, octadecadienoic, or octadectrienoic acids. In one embodiment, the ester is a fatty acid ester of dodecyl alcohol, hexadecyl alcohol or octadecyl alcohol. In one embodiment, the ester comprises octadecyl octadecanoate (also known as stearyl stearate).

In one embodiment, the rubber composition may include at least one amide of the formula III

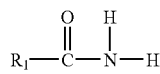

(III)

where $R_1$ is $C_{12}$-$C_{36}$ alkyl, $C_{12}$-$C_{36}$ alkenyl, or $C_{12}$-$C_{36}$ alkadienyl. In one embodiment, the amide may be an amide of a saturated or unsaturated monovalent amines, or saturated or unsaturated polyvalent amines, for example, caprylamine, laurylamine, palmitylamine, stearylamine, oleylamine, myristylamine, methylenediamine, ethylenediamine, hexamethylenediamine, and ammonia, and the like. In one embodiment, the amide may be caprylamide, laurylamide, palmitylamide, stearylamide, oleamide, myristylamide, and the like.

For ease in handling, the alcohol of formula I, ester of formula II, or amide of formula III may be used as is or may be deposited on suitable carriers. Examples of carriers which may be used in the present invention include silica, carbon black, alumina, kieselguhr, silica gel and calcium silicate.

In one embodiment, the rubber composition comprises from 1 to 50 parts by weight, per 100 parts by weight of rubber (phr), of the additive selected from alcohols of formula I, esters of formula II, and amides of formula III. In another embodiment, the rubber composition comprises from 2 to 25 phr of the additive selected from alcohols of formula I, esters of formula II, and amides of formula III.

In addition to the additive selected from alcohols of formula I, esters of formula II, and amides of formula III, the rubber composition contains a rubber containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate. Additional examples of rubbers which may be used include a carboxylated rubber, silicon-coupled and tin-coupled star-branched polymers. In one embodiment the rubber or elastomers are polybutadiene, SBR, and synthetic and natural polyisoprene.

In one embodiment, the rubber to be combined with the additive selected from alcohols of formula I, esters of formula II, and amides of formula III may be a blend of at least two diene based rubbers. In one embodiment, a blend of two or more rubbers may be used such as cis 1,4-polyisoprene rubber (natural or synthetic), emulsion and solution polymerization derived styrene butadiene rubbers, and cis 1,4-polybutadiene rubbers.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

The solution polymerization prepared SBR (S-SBR) typically has a bound styrene content in a range of about 5 to about 50, alternatively about 9 to about 36, percent. The S-SBR can be conveniently prepared, for example, by organo lithium catalyzation in the presence of an organic hydrocarbon solvent.

The cis 1,4-polybutadiene rubber (BR) is considered to be beneficial for a purpose of enhancing the tire wear. Such BR can be prepared, for example, by organic solution polymerization of 1,3-butadiene. The BR may be conveniently characterized, for example, by having at least a 90 percent cis 1,4-content.

The term "phr" as used herein, and according to conventional practice, refers to "parts by weight of a respective material per 100 parts by weight of rubber, or elastomer." In addition, conventional fillers may be also present. The amount of such conventional fillers may range from 10 to 250 phr. In one embodiment, the filler is present in an amount ranging from 20 to 100 phr.

The commonly employed siliceous pigments which may be used in the rubber compound include conventional pyrogenic and precipitated siliceous pigments (silica). In one embodiment precipitated silica is used. The conventional siliceous pigments that may be employed in this invention are in one embodiment precipitated silicas such as, for example, those obtained by the acidification of a soluble silicate, e.g., sodium silicate.

Such conventional silicas might be characterized, for example, by having a BET surface area, as measured using nitrogen gas, in one embodiment in the range of about 40 to about 600, and in another embodiment in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210,243, etc; silicas available from Rhone-Poulenc, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N115, N121, N134, N220, N231, N234, N242, N293, N299, N315, N326, N330, M332, N339, N343, N347, N351, N358, N375, N539, N550, N582, N630, N642, N650, N660, N683, N754, N762, N765, N774, N787, N907, N908, N990 and N991. These carbon blacks have iodine absorptions ranging from 9 to 170 g/kg and DBP No. ranging from 34 to 150 cm$^3$/100 g.

In one embodiment the rubber composition for use in the tire component may additionally contain a sulfur containing organosilicon compound. Examples of suitable sulfur containing organosilicon compounds are of the formula:

Z-Alk-S$_n$-Alk-Z in which Z is selected from the group consisting of

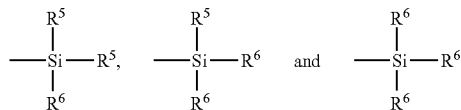

where R$^5$ is an alkyl group of 1 to 4 carbon atoms, cyclohexyl or phenyl; R$^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl)disulfide, 3,3'-bis(triethoxysilylpropyl)disulfide, 3,3'-bis(triethoxysilylpropyl)tetrasulfide, 3,3 '-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl) tetrasulfide, 12,12'-bis(triisopropoxysilyl dodecyl)disulfide, 18,1 8'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl) trisulfide, 3,3'-bis(trimethoxysilyl-2-methylpropyl) tetrasulfide, 3,3 '-bis(dimethoxyphenylsilyl-2-methylpropyl) disulfide.

In one embodiment the sulfur containing organosilicon compounds are the 3,3'-bis(trimethoxy or triethoxy silylpropyl)sulfides. In one embodiment the compounds are 3,3'-bis(triethoxysilylpropyl)disulfide and 3,3'-bis(triethoxysilylpropyl)tetrasulfide. Therefore as to the above formula, in one embodiment Z is

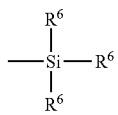

where R$^6$ is an alkoxy of 2 to 4 carbon atoms, with 2 carbon atoms being used in one embodiment; alk is a divalent hydrocarbon of 2 to 4 carbon atoms with 3 carbon atoms being used in one embodiment; and n is an integer of from 2 to 5 with 2 and 4 being used in one embodiment.

The amount of the sulfur containing organosilicon compound of the above formula in a rubber composition will vary depending on the level of other additives that are used. Generally speaking, the amount of the compound of the above formula will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur vulcanizing agent is elemental sulfur. The sulfur vulcanizing agent may be used in an amount ranging from 0.5 to 8 phr, with a range of from 1.5 to 6 phr being used in one embodiment. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, in another embodiment about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator is in one embodiment a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and compound is mixed in one or more non-productive mix stages. The terms "non-productive" and "productive" mix stages are well known to those having skill in the rubber mixing art. If the rubber composition contains a sulfur-containing organosilicon compound, one may subject the rubber composition to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

For illustration of one embodiment of the invention, reference is made to the accompanying drawing in which is depicted a cross-sectional view of a belted radial ply tire 1.

In the drawing, components of the tire 1 are shown as being its tread 2, sidewall(s) 5, shoulder region(s) 4 abridging the tread 2 and sidewall(s) 5, spaced "bundled" wire beads 6 with apexes 8 and supporting fabric reinforced carcass 3.

The chafer component 9 of the tire is positioned in its bead region 6, basically between the bead 6 and the rigid tire rim on which the tire is to be mounted. The chafer component 9 comprises the self-lubricating rubber composition disclosed herein.

The chafer may be a component of various types of pneumatic tires, including but not limited to passenger car tires, truck tires, aircraft tires, and off-the-road tires. Examples of the use of chafers in such tires are disclosed in U.S. Pat. Nos. 4,898,223; 5,885,389; 6,442,280; 6,648,041; and 6,719,029.

In one embodiment, the chafer is used in heavy tires that experience high loads and deflections such as off-the-road earthmover and airplane pneumatic tires that may be subjected to tremendous stresses and heat buildup problems in the bead area. Such heavy tires may be various large off-the-road tires as well as various truck tires, as compared to significantly smaller tires intended for use on passenger automobiles. Heavy tires may be characterized as having a tread region cross-section of a thickness of 4 centimeters or more. Such heavy tires may be used for example in mining operations on vehicles weighing over 600 tons when fully loaded. Radial deflections of these tires may occur under very high impacts while the tire is heavily loaded. In use, these tires may deflect with the bead portion contacting the rim flange harshly. Repeated impacts in this area can cause a phenomena herein referred to as "bead erosion" or "rim erosion". These severe deflections may stress the internal components of an unprotected tire carcass such as ply endings and other component interfaces, and if severe enough may initiate ply ending separation or other associated problems which can injure the tire's casing. To avoid such problems, the pneumatic tire includes the chafer of the invention in its various embodiments.

In another embodiment, the chafer may be used in a run-flat passenger tire. Such run-flat tires, unlike the above-mentioned high pressure and high-torque tires of the aircraft and off-the-road industry, may operate similarly to conventional passenger tires with the exception that these tires generally have stiffened sidewalls that when the tire is operated with little or no air must support the weight of the vehicle. In such situations, high deflection and loads may be transmitted to the bead area of the tire. Rapidly, these uninflated tires may build up high heat which can limit the run-flat capability of the tire. In these circumstances, the run-flat passenger tire may become overstressed and overloaded similar to the conditions seen in the high pressure, high load and high torque applications of the larger aircraft and off-the-road tires. Therefore, the run-flat tire design may also be equipped with the chafer to accommodate these conditions.

The chafer may be constructed by any of various rubber processing methods as are known in the art, including but not limited to calendaring. The tire with the chafer may be constructed using methods as are known in the art.

Vulcanization of the tire is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air.

EXAMPLE I

In this Example, a alcohol of formula I and an ester of formula II were evaluated in a rubber composition containing carbon black.

Rubber compositions containing the materials set out in Table 1 were prepared using four separate stages of addition (mixing); namely three non-productive mix stages and one productive mix stage. The non-productive stages were mixed for four minutes to a rubber temperature of 160° C. The productive stage was mixed for two minutes, and the drop temperature for the productive mix stage was 115° C.

The rubber compositions are identified as Sample A-H. Samples A, D, E and H are considered as controls due to the absence of the alcohol or ester.

The Samples were cured at about 150° C. for about 32 minutes.

Table 2 illustrates the physical properties of the cured Samples A through H.

The coefficient of friction (COF) test is done according to ASTM D-1894 on a Model SP-2000 Slip/Peel Tester from IMASS Inc. Samples are tested at 6 inches per minute using a 200 g sled. The COF is measured against a polished aluminum surface.

TABLE 1

| | Sample | | | | | | | |
|---|---|---|---|---|---|---|---|---|
| | Control A | B | C | Control D | Control E | F | G | Control H |
| Non Productive Stage 1 | | | | | | | | |
| Natural Rubber | 80 | 80 | 80 | 80 | 80 | 80 | 80 | 80 |
| Carbon black | 12 | 12 | 12 | 12 | 12 | 12 | 12 | 12 |
| Wax | 0.4 | 0.4 | 0.4 | 0.4 | 0.4 | 0.4 | 0.4 | 0.4 |

TABLE 1-continued

| | Sample | | | | | | | |
|---|---|---|---|---|---|---|---|---|
| | Control A | B | C | Control D | Control E | F | G | Control H |
| Fatty Acid | 2 | 2 | 2 | 2 | 2 | 2 | 2 | 2 |
| Zinc Oxide | 3 | 3 | 3 | 3 | 3 | 3 | 3 | 3 |
| Stearyl stearate | 0 | 2.5 | 5 | 0 | 0 | 0 | 0 | 0 |
| Aromatic oil | 0 | 0 | 0 | 2.5 | 5 | 0 | 0 | 0 |
| Octadecanol | 0 | 0 | 0 | 0 | 0 | 2.5 | 5 | 0 |
| Non Productive Stage 2 | | | | | | | | |
| polybutadiene | 20 | 20 | 20 | 20 | 20 | 20 | 20 | 20 |
| Carbon black | 10 | 10 | 10 | 10 | 10 | 10 | 10 | 10 |
| Silica | 7 | 7 | 7 | 7 | 7 | 7 | 7 | 7 |
| Non Productive Stage 3 | | | | | | | | |
| Carbon black | 13 | 13 | 13 | 13 | 13 | 13 | 13 | 13 |
| Antioxidant | 1 | 1 | 1 | 1 | 1 | 1 | 1 | 1 |
| Silane Coupler | 3 | 3 | 3 | 3 | 3 | 3 | 3 | 3 |
| Productive Stage | | | | | | | | |
| Antioxidant | 0.5 | 0.5 | 0.5 | 0.5 | 0.5 | 0.5 | 0.5 | 0.5 |
| Zinc Oxide | 1 | 1 | 1 | 1 | 1 | 1 | 1 | 1 |
| Sulfur | 1.9 | 1.9 | 1.9 | 1.9 | 1.9 | 1.9 | 1.9 | 1.9 |
| Accelerator | 1.35 | 1.35 | 1.35 | 1.35 | 1.35 | 1.35 | 1.35 | 1.35 |

TABLE 2

| | A | B | C | D | E | F | G | H |
|---|---|---|---|---|---|---|---|---|
| RPA500 | | | | | | | | |
| Uncured G' | 142 | 131 | 127 | 139 | 129 | 132 | 122 | 155 |
| Cured G' 10% Strain | 1546 | 1427 | 1331 | 1479 | 1412 | 1443 | 1345 | 1574 |
| Cured TD 10% Strain | 0.061 | 0.059 | 0.053 | 0.054 | 0.057 | 0.054 | 0.05 | 0.055 |
| Rheometer, 150 C. | | | | | | | | |
| Max Torq | 20.98 | 19.65 | 18.3 | 19.93 | 19.2 | 19.41 | 18.35 | 20.85 |
| Min Torq | 1.89 | 1.73 | 1.69 | 1.83 | 1.76 | 1.77 | 1.61 | 2.02 |
| Delta Torq | 19.09 | 17.92 | 16.61 | 18.1 | 17.44 | 17.64 | 16.74 | 18.83 |
| T90 | 10.34 | | 10.56 | 10.76 | 10.81 | 11.25 | 10.25 | 9.85 | 10.48 |
| Stress-Strain, cured 32 minutes at 150 C. | | | | | | | | |
| Tens Strength | 21.63 | 23.11 | 23.93 | 23.23 | 22.46 | 22.8 | 23.2 | 24.57 |
| Elong Break | 406 | 443 | 468 | 448 | 455 | 439 | 460 | 442 |
| M300 | 15.14 | 14.14 | 13.34 | 13.96 | 12.99 | 14.08 | 13.27 | 15.15 |
| Hardness, cured 32 minutes at 150 C. | | | | | | | | |
| RT | 66 | 65 | 64 | 63 | 63 | 65 | 64 | 65 |
| 100 C. | 62 | 61 | 58 | 60 | 59 | 60 | 58 | 61 |
| Rebound, cured 32 minutes at 150 C. | | | | | | | | |
| RT | 63 | 62 | 61 | 63 | 62 | 62 | 60 | 64 |
| 100 C. | 73 | 74 | 74 | 74 | 73 | 74 | 74 | 74 |

TABLE 2-continued

|  | A | B | C | D | E | F | G | H |
|---|---|---|---|---|---|---|---|---|
| Tear Strength 32/150 C. | | | | | | | | |
| 95 C., N | 36 | 47 | 53 | 44 | 49 | 43 | 49 | 36 |
| Tear Strength 32/150 C. | | | | | | | | |
| 23 C., N | 143 | 166 | 181 | 181 | 236 | 168 | 178 | 168 |
| DIN Abrasion 32/150 C. | | | | | | | | |
| Relative loss | 105 | 91 | 85 | 105 | 108 | 79 | 60 | 95 |
| Coefficient of Friction | | | | | | | | |
| Value | 2.86 | 2.38 | 2.17 | 2.87 | 2.79 | 2.23 | 1.59 | 2.71 |

It can be seen from Table 2 that use of stearyl stearate or stearyl alcohol resulted in reduced coefficient of friction as compared with use of aromatic oil or no additive. In addition, the use of stearyl stearate or stearyl alcohol results in improved abrasion resistance as compared with the controls.

EXAMPLE II

In this Example, two amides of formula III were evaluated in a rubber composition containing carbon black.

Rubber compositions containing the materials set out in Table 3 were prepared using four separate stages of addition (mixing); namely three non-productive mix stages and one productive mix stage. The non-productive stages were mixed for four minutes to a rubber temperature of 160° C. The productive stage was mixed for two minutes, and the drop temperature for the productive mix stage was 115° C.

The rubber compositions are identified as Samples I-P. Samples I, L, M and P are considered as controls due to the absence of the amide.

The Samples were cured at about 150° C. for about 32 minutes.

Table 4 illustrates the physical properties of the cured Samples I through P.

The coefficient of friction (COF) test is done according to ASTM D-1894 on a Model SP-2000 Slip/Peel Tester from IMASS Inc. Samples are tested at 6 inches per minute using a 200 g sled. The COF is measured against a polished aluminum surface.

TABLE 3

|  | Control I | J | K | Control L | Control M | N | O | Control P |
|---|---|---|---|---|---|---|---|---|
| Non Productive Mix Stage | | | | | | | | |
| Natural Rubber | 100 | 100 | 100 | 100 | 70 | 70 | 70 | 70 |
| polybutadiene | 0 | 0 | 0 | 0 | 12 | 12 | 12 | 12 |
| E-SBR | 0 | 0 | 0 | 0 | 18 | 18 | 18 | 18 |
| Carbon black | 50 | 50 | 50 | 50 | 50 | 50 | 50 | 50 |
| Fatty Acid | 2 | 2 | 2 | 2 | 2 | 2 | 2 | 2 |
| Zinc Oxide | 5 | 5 | 5 | 5 | 5 | 5 | 5 | 5 |
| Antioxidant | 2 | 2 | 2 | 2 | 2 | 2 | 2 | 2 |
| Stearamide | 0 | 5 | 0 | 0 | 0 | 5 | 0 | 5 |
| Oleamide | 0 | 0 | 5 | 0 | 0 | 0 | 5 | 0 |
| Processing Oil | 5 | 0 | 0 | 5 | 5 | 0 | 0 | 5 |
| Productive Mix Stage | | | | | | | | |
| Sulfur | 1.4 | 1.4 | 1.4 | 1.4 | 1.4 | 1.4 | 1.4 | 1.4 |
| Accelerator | 1 | 1 | 1 | 1 | 1 | 1 | 1 | 1 |

TABLE 4

|  |  |  |  |  |  |  |  |  |
|---|---|---|---|---|---|---|---|---|
| RPA500 | | | | | | | | |
| Unc G' | 190 | 181 | 184 | 195 | 204 | 174 | 192 | 183 |
| Cured G' 10% Strain | 1351 | 1370 | 1339 | 1374 | 1474 | 1471 | 1434 | 1418 |
| Cured TD 10% Strain | 0.102 | 0.097 | 0.098 | 0.104 | 0.105 | 0.09 | 0.103 | 0.105 |
| Rheometer 150 C. | | | | | | | | |
| Max Torq | 16.68 | 17.79 | 17.32 | 16.66 | 17.71 | 17.83 | 18.01 | 17.25 |
| Min Torq | 2.6 | 2.53 | 2.62 | 2.55 | 2.62 | 2.37 | 2.63 | 2.47 |
| Delta Torq | 14.08 | 15.26 | 14.7 | 14.11 | 14.55 | 15.46 | 15.38 | 14.78 |
| T90 | 12.15 | 6.79 | 6.81 | 11.93 | 16.61 | 8.72 | 8.32 | 16.2 |
| Stress-Strain 32/150 C. | | | | | | | | |
| Tens Strength | 24 | 24.2 | 24.8 | 23.2 | 22.5 | 22.6 | 23.1 | 22.5 |
| Elong Break | 482 | 450 | 486 | 473 | 462 | 432 | 460 | 464 |
| M300 | 12.8 | 15.2 | 13.5 | 12.8 | 13 | 14.8 | 13.7 | 13 |
| Hardness 32/150 C. | | | | | | | | |
| RT | 64 | 69 | 66 | 64 | 67 | 71 | 68 | 66 |
| 100 C. | 58 | 58 | 57 | 58 | 60 | 60 | 60 | 60 |

TABLE 4-continued

| | | | Rebound 32/150 C. | | | | | |
|---|---|---|---|---|---|---|---|---|
| RT | 49 | 46 | 44 | 48 | 48 | 45 | 43 | 47 |
| 100 C. | 62 | 64 | 63 | 61 | 60 | 61 | 61 | 60 |
| | | | Tear Strength 32/150 C. | | | | | |
| 95 C., N | 195 | 145 | 162 | 175 | 119 | 95 | 103 | 109 |
| | | | Tear Strength 32/150 C. | | | | | |
| 95 C., N, Aged | 136 | 96 | 137 | 121 | 69 | 61 | 76 | 69 |
| | | | DIN Abrasion 32/150 C. | | | | | |
| Relative loss | 149 | 120 | 121 | 156 | 121 | 104 | 93 | 112 |
| | | | Coefficient of Friction | | | | | |
| Value | | 3.22 | 2.61 | 1.9 | 3.41 | 3.26 | 1.58 | 1.35 | 2.97 |

It can be seen from Table 4 that use of stearamide or oleamide resulted in reduced coefficient of friction as compared with use of processing oil or no additive. In addition, the use of stearamide or oleamide results in improved abrasion resistance as compared with the controls.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising a pair of spaced apart bead components, a connecting carcass between said bead components, and a rubber chafer positioned around at least a portion of each of said bead components and intended for contacting a rigid rim of a wheel, wherein said chafer comprises a self lubricating rubber composition, the self lubricating rubber composition comprising at least one rubber and from 2.5 to 5 phr of stearyl stearate, wherein the rubber composition has a coefficient of friction ranging from 2.17 to 2.38 as measured by ASTM D-1894, and wherein the tire is a heavy tire having a tread with a tread cross section of at least 4 centimeters thick.

2. The pneumatic tire of claim 1 wherein the composition further comprises 10 to 250 phr of a filler selected from carbon black and silica.

3. The pneumatic tire of claim 2 wherein said filler comprises silica.

4. The pneumatic tire of claim 2 wherein said filler comprises carbon black.

5. The pneumatic tire of claim 2 wherein the composition further comprises from 0.5 to 20 phr of a sulfur containing organosilicon compound of the formula:

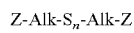

in which Z is selected from the group consisting of

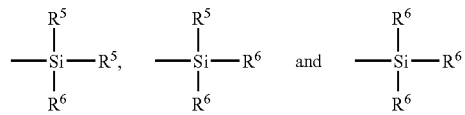

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

6. The pneumatic tire of claim 5 wherein said composition is thermomechanically mixed at a rubber temperature in a range of from 140° C. to 190° C. for a total mixing time of from 1 to 20 minutes.

7. The pneumatic tire of claim 1 wherein the rubber is selected from the group consisting of polybutadienes, styrene-butadiene rubbers, synthetic polyisoprenes, and natural polyisoprenes.

* * * * *

UNITED STATES PATENT AND TRADEMARK OFFICE
CERTIFICATE OF CORRECTION

| | |
|---|---|
| PATENT NO. | : 7,231,951 B2 |
| APPLICATION NO. | : 11/020883 |
| DATED | : June 19, 2007 |
| INVENTOR(S) | : Paul Harry Sandstrom et al. |

It is certified that error appears in the above-identified patent and that said Letters Patent is hereby corrected as shown below:

On the Title Page, (75) Inventors: correct "James Seven Guzi" to --James Steven Guzi.--

Signed and Sealed this

Fourth Day of September, 2007

JON W. DUDAS
*Director of the United States Patent and Trademark Office*